May 28, 1957 J. W. SWENDSEN 2,794,135
HEAT EXCHANGER FOR FLUIDS
Filed Jan. 25, 1954

JOHAN WARFRED SWENDSEN
BY

United States Patent Office 2,794,135
Patented May 28, 1957

2,794,135

HEAT EXCHANGER FOR FLUIDS

Johan Walfred Swendsen, Oslo, Norway

Application January 25, 1954, Serial No. 405,907

Claims priority, application Norway February 5, 1953

1 Claim. (Cl. 310—57)

Electrical machines, e. g. motors, are manufactured in two main types, namely as open and as closed motors.

Purchase of open motors is comparatively inexpensive and the cooling which is created by a strong current of air passing through the motor along the windings etc., may be very effective, so that the size of the motor may be small compared with the out-put of the motor.

This type of motor has, however, a drawback in that the volume of air which passes through the motor is bringing, in some cases, large quantities of dust and dirt which by the time is deposited on both the windings of the motor and on its iron circuit. Under unfavorable conditions, these deposits will, together with dew and moisture in the air, form acid solutions which in time may be sufficiently concentrated to corrode the electrical insulation and the iron parts which gradually rust away and lower the efficiency of the machine.

It is obvious that these drawbacks sooner or later result in that the motor will have to be replaced, due to parts which are destroyed by corrosion. A motor which is damaged in this way can, as a rule, not be repaired, as the parts of the iron circuit of mild iron easily rust and corrode to a comparatively large extent before one is aware of something being wrong. That a new motor has to be purchased is an unessential expense as compared with the economical losses involved in a shut-down.

The above mentioned drawbacks are eliminated and a longer life for the motor is obtained in closed or enclosed motors in which the inner parts of the motor are substantially hermetically sealed from the surrounding air. The cooling will, in this case, occur as heat conduction through the material of the motor, and an air-current which is produced, for example by a fan, sweeps along the outside of the motor. For sufficient cooling, the motor is required to have larger cooling surfaces than the case is in open motors, and heat which is developed in the rotor of an enclosed motor must firstly be transferred to the enclosed volume of air and thereafter along to the stator of the motor, as the quantity of heat which is conducted away through the shaft of the motor and its bearings is extremely small. Thus, the motor must in addition to said large outer cooling surfaces, contain air in a quantity which is able to transfer sufficient heat from the rotor to the stator, without the temperature rising above the statutory limit.

Due to the less efficient cooling of enclosed motors, the insulating parts, especially in the rotor, must be of a better quality than the insulation which satisfies the requirements for open motors.

The object of the present invention is to eliminate the disadvantages of both types of motors, the invention enabling the manufacture of enclosed motors of the same size as open motors with corresponding output.

Further the invention makes it possible in a simple manner to rebuild already existing open motors to enclosed motors, without reduction of output and without substantial changes.

Thus, the invention consists in a heat exchanger for fluids, for example, a heat exchanger for use in connection with an electric dynamo, and is mainly characterized in that the heat exchanger is constructed as a double-sided rotatable fan and constitutes a wall between the two spaces between which the heat exchange is to take place, the fluid on one side being forced to move along the surfaces of the heat exchanger on one side of the fan, while the fluid on the other side in a corresponding manner is brought into movement by the other side of the fan, the heat exchange taking place as conduction through the material of the fan.

The invention will in the following be more closely described with reference to the drawing which illustrates two embodiments of the invention.

Figure 1:
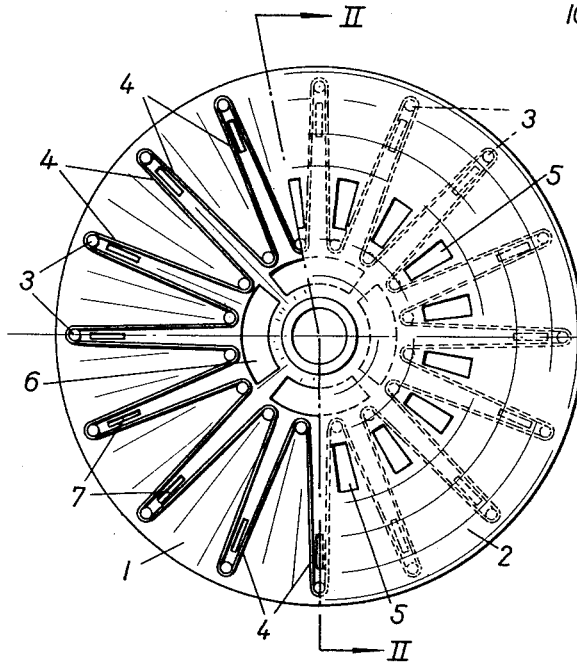
Fig. 1 is one embodiment of the heat exchanger according to the invention.
Figure 2:
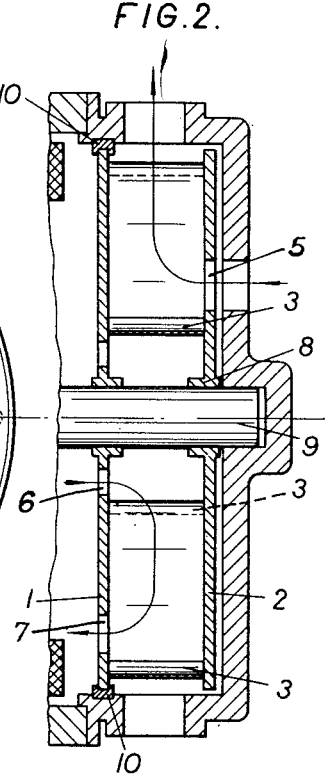
Fig. 2 shows the heat exchanger arranged in a motor and is a section along the line II—II in Fig. 1.
Figure 3:
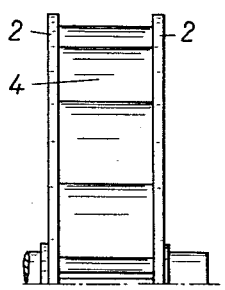
Fig. 3 is a side view of one half of the heat exchanger in Fig. 1.

The heat exchanger in Figs. 1, 2 and 3, consists of two spaced circular discs 1 and 2 which are attached to each other by means of spacers in the form of round bolts 3, both along the circumference of the discs 1 and 2 and near their centres. Around the bolts 3, a heat exchange member in the form of a thin metal band 4 with high thermal conductivity is laid zig-zag in such a way that a fan with hollow fan blades is formed between the discs 1 and 2. On the drawing, the left half of the disc 2 is removed (Fig. 1). The disc 2 is provided with apertures 5 which lead to the bottom between the fan blades, which are formed by the outer surface of the band 4, whereby air or any other fluid, by rotation of the fan, will be drawn through the apertures 5 and thrown radially outwards between the discs 1 and 2 due to the action of the centrifugal force. The cold outer air will flow along the outer surface of the band 4. The disc 1 is near its centre provided with apertures 6 which lead air to the inner side of the band 4. By rotation of the fan, this air will be thrown into the tips of the hollow fan blades and will flow out through the apertures 7 provided at the said tips.

As shown in Figs. 2 and 3, the band 4 closes air-tight to the discs 1 and 2, and each of said discs is further provided with a bushing 8 which fits tightly on the shaft 9 of the motor. When the motor is running, the heat exchanger will rotate together with the rotor, and the outer cold air will, as described, be drawn in through the apertures 5 in the disc 2, whereafter it is thrown radially outwards and flows along the metal band 4. At the same time, the air in the interior of the motor will be drawn in through the apertures 6 near the centre of the disc 1 and will be forced into the hollow fan blades where the air flows along the inner side of the band 4, which is cooled by the outer air, as mentioned above, whereby also the interior air is cooled before it is again returned to the motor through the apertures 7.

As long as the heat exchanger according to the invention rotates, a heat exchange will take place through the band 4, from the hot air in the motor to the colder outer air. A very effective cooling is thus obtained without renewal of the quantity of air in the motor. The current circuits for the inner and the outer air is shown diagrammatically by means of the arrows in Fig. 2.

In the embodiment shown in Figs. 1, 2 and 3, the disc 1 is arranged absolutely tight in the motor housing by means of a packing 10 which extends around the circumference of the disc 1. The packing 10 is not subjected to any pressure strains as there is no difference in pressure between the inner and the outer air.

Figure 4:
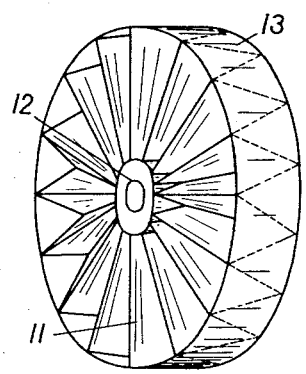
Fig. 4 is a perspective view of a second embodiment.
Figure 5:
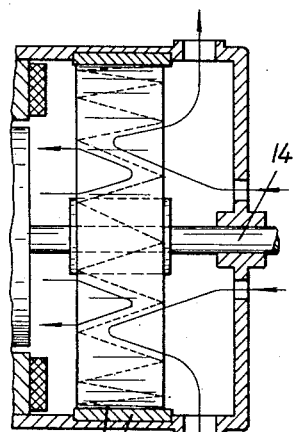
Fig. 5 shows the heat exchanger in Fig. 4, arranged in a motor.

A further embodiment is shown in Figs. 4 and 5. The heat exchanger consists in this case of a folded or corrugated sheet 11 which is attached to a hub 12 perpendicularly on the axis of rotation of the hub. A band 13 is arranged on the circumference of the sheet 11, said band serving to deflect the air currents which, due to the centrifugal force, are thrown radially outwards along the folds or corrugations in the sheet 11 and which flows along both sides of the sheet 11 when said sheet rotates.

Fig. 5 shows the heat exchanger in Fig. 4 arranged in a machine on the shaft 14 of the rotor. Due to the rotation of the heat exchanger, the air on both sides is drawn in at the centre of the heat exchanger and is thrown radially outwards along the corrugations of the sheet 11, whereby a heat exchange will take place between the heated air in the machine and the colder outer air through the material in the sheet 11. A packing 15 prevents dust and dirt in the outer air from entering the machine. The air currents are shown diagrammatically by means of the arrows in Fig. 5.

Other embodiments than those described above may be evolved within the scope of the invention. The heat exchanger may, for example, consist of a disc with fan blades on both sides cast in one piece, or of a disc with projections or ribs on both sides.

By means of the device according to the invention, a heat exchange is obtained which is so effective that the cooling, for example, of the interior of the motor will be as effective as when a stream of air is blown through the machine. This implies i. a. that a closed motor may be built in the same size as an open motor of the same output, at the same time as the commonly known disadvantages in enclosed motors are avoided.

The fields of application of the invention is not limited to rotating machines only, but may, of course, also be employed in other machines or devices where it is desirable that an exchange of heat should take place. In that case, the heat exchanger may be driven by a separate motor or the like.

I claim:

In a rotating electric machine having a casing and a shaft rotatable therein, a heat exchanger mounted on said shaft within said casing comprising two spaced discs attached to said shaft, a plurality of spacers between said discs, a portion of said spacers arranged about a circle on said discs adjacent the center therein, and the remainder of said spacers adjacent the periphery of said discs, and a heat exchange member in gastight relationship between said discs and wound first around a center spacer and then around a peripheral spacer around the entire circumference of said discs to form a fan having a plurality of hollow fan blades, and one of said discs having apertures therein between each of said fan blades adjacent said center spacers, and the other of said discs having a plurality of apertures within the circle formed by said center spacers and a plurality of apertures within the ends of said hollow fan blades, a packing between the periphery of said disc having the central apertures and the apertures within the fan blades and said casing, and a plurality of apertures in said casing between the peripheries of said discs and a plurality of apertures in said casing adjacent said shaft.

References Cited in the file of this patent
UNITED STATES PATENTS

| | | |
|---|---|---|
| 1,677,433 | Daun | July 17, 1928 |
| 1,901,381 | Smith | Mar. 14, 1933 |
| 1,996,460 | Coates | Apr. 2, 1935 |
| 2,332,969 | Highley | Oct. 26, 1943 |
| 2,362,044 | Blancha | Mar. 7, 1944 |
| 2,460,752 | Jacobsen | Feb. 1, 1949 |
| 2,550,443 | Bennett | Apr. 24, 1951 |

FOREIGN PATENTS

| | | |
|---|---|---|
| 539,730 | Germany | Dec. 1, 1931 |